United States Patent
Luo et al.

(10) Patent No.: US 10,452,074 B2
(45) Date of Patent: Oct. 22, 2019

(54) METHOD AND SYSTEM FOR CONTROLLING AUTONOMOUS DRIVING VEHICLE REENTERING AUTONOMOUS DRIVING MODE

(71) Applicants: Baidu USA LLC, Sunnyvale, CA (US); Baidu.com Times Technology (Beijing) Co., Ltd., Beijing (CN)

(72) Inventors: Qi Luo, Sunnyvale, CA (US); Qi Kong, Sunnyvale, CA (US); Fan Zhu, Sunnyvale, CA (US); Sen Hu, Sunnyvale, CA (US); Xiang Yu, Sunnyvale, CA (US); Zhenguang Zhu, Beijing (CN); Yuchang Pan, Beijing (CN); Jiarui He, Beijing (CN); Haoyang Fan, Sunnyvale, CA (US); Guang Yang, San Jose, CA (US); Jingao Wang, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

(*) Notice: Subject to any disclaimer, the term of this patent is extended or adjusted under 35 U.S.C. 154(b) by 290 days.

(21) Appl. No.: 15/510,817

(22) PCT Filed: Mar. 10, 2017

(86) PCT No.: PCT/CN2017/076239
§ 371 (c)(1),
(2) Date: Mar. 13, 2017

(87) PCT Pub. No.: WO2018/161335
PCT Pub. Date: Sep. 13, 2018

(65) Prior Publication Data
US 2018/0299898 A1    Oct. 18, 2018

(51) Int. Cl.
*G05D 1/00* (2006.01)
*B60W 30/00* (2006.01)
(Continued)

(52) U.S. Cl.
CPC .......... *G05D 1/0223* (2013.01); *B60W 30/143* (2013.01); *B60W 50/082* (2013.01);
(Continued)

(58) Field of Classification Search
CPC ....... G05D 1/00; G05D 1/0223; B60W 30/00; B60W 30/143; B60W 50/00; B60W 50/082
See application file for complete search history.

(56) References Cited

U.S. PATENT DOCUMENTS 6,442,472 B1* 8/2002 Vivek .................. F02D 11/105
                                                   123/350
10,017,189 B2* 7/2018 Yamada ................ B60W 50/10
(Continued)

*Primary Examiner* — Yonel Beaulieu
(74) *Attorney, Agent, or Firm* — Womble Bond Dickinson (US) LLP

(57) ABSTRACT

When an ADV is detected to transition from a manual driving mode to an autonomous driving mode, a first pedal value corresponding to a speed of the ADV at a previous command cycle during which the ADV was operating in the manual driving mode is determined. A second pedal value is determined based on a target speed of the ADV at a current command cycle during which the ADV is operating in an autonomous driving mode. A pedal value represents a pedal percentage of a maximum pedal pressure or maximum pedal pressed distance of a throttle pedal or brake pedal from a neutral position. A speed command is generated and issued to the ADV based on the first pedal value and the second pedal value, such that the ADV runs in a similar acceleration before and after switching from the manual driving mode to the autonomous driving mode.

24 Claims, 9 Drawing Sheets

(51) Int. Cl.
*B60W 50/00* (2006.01)
*G05D 1/02* (2006.01)
*B60W 50/08* (2012.01)
*B60W 30/14* (2006.01)

(52) U.S. Cl.
CPC ... *G05D 1/0061* (2013.01); *B60W 2050/0074* (2013.01); *B60W 2050/0096* (2013.01); *B60W 2510/0657* (2013.01); *B60W 2520/10* (2013.01); *B60W 2520/105* (2013.01); *B60W 2540/10* (2013.01); *B60W 2720/106* (2013.01); *G05D 2201/0213* (2013.01)

(56) References Cited

U.S. PATENT DOCUMENTS

| | | | |
|---|---|---|---|
| 10,059,330 B2* | 8/2018 | Gaither | F02D 41/0047 |
| 2008/0243323 A1* | 10/2008 | Karnjate | B60T 7/042 |
| | | | 701/22 |
| 2016/0362116 A1* | 12/2016 | Otsuka | G05D 1/0061 |
| 2017/0225691 A1* | 8/2017 | Yamada | B60W 50/10 |
| 2018/0215368 A1* | 8/2018 | Isono | B60T 7/042 |
| 2018/0236876 A1* | 8/2018 | Isono | B60L 7/26 |

* cited by examiner

METHOD AND SYSTEM FOR CONTROLLING AUTONOMOUS DRIVING VEHICLE REENTERING AUTONOMOUS DRIVING MODE

CROSS-REFERENCE TO RELATED APPLICATION

This patent application is a U.S. National Phase Application under 35 U.S.C. § 371 of International Application No. PCT/CN2017/076239, filed Mar. 10, 2017, entitled "METHOD AND SYSTEM FOR CONTROLLING AUTONOMOUS DRIVING VEHICLE REENTERING AUTONOMOUS DRIVING MODE," which is incorporated by reference herein by its entirety.

TECHNICAL FIELD

Embodiments of the present invention relate generally to operating autonomous vehicles. More particularly, embodiments of the invention relate to controlling an autonomous driving vehicle when reentering an autonomous driving mode from a manual driving mode.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Typically, an autonomous driving vehicle (ADV) can operate either in a manual driving mode or in an autonomous driving mode. In a manual driving mode, a human driver takes control of the vehicle. There are scenarios when an ADV switches out of an autonomous driving mode while the vehicle is running and needs to reenter the autonomous driving mode. When the vehicle reenters the autonomous driving mode from the manual driving mode, passengers may experience sudden acceleration or deceleration during the driving mode transition. This is due to the sudden jumps of velocity or acceleration/deceleration reference during the driving mode transition. This would ultimately cause discontinuity in an output of a controller and therefore cause sudden acceleration or deceleration changes during the driving mode transition. The bumps such as sudden changes of speeds may occur during this reentering stage that may cause passengers uncomfortable.

SUMMARY

Embodiments of the present disclosure provide a computer-implemented method for operating an autonomous driving vehicle, a non-transitory machine-readable medium, and a data processing system.

In an aspect of the disclosure, the computer-implemented method for operating an autonomous driving vehicle comprises: detecting that the autonomous driving vehicle (ADV) transitions from a manual driving mode to an autonomous driving mode; determining a first pedal value corresponding to a speed of the ADV in response to a speed control command issued at a previous command cycle during which the ADV was operating in the manual driving mode; determining a second pedal value based on a target speed of the ADV at a current command cycle during which the ADV is operating in the autonomous driving mode; and issuing a speed control command to the ADV based on the first pedal value and the second pedal value, such that the ADV runs in a similar acceleration before and after switching from the manual driving mode to the autonomous driving mode.

In another aspect of the disclosure, the non-transitory machine-readable medium has instructions stored therein, which when executed by a processor, cause the processor to perform operations, the operations comprising: detecting that the autonomous driving vehicle (ADV) transitions from a manual driving mode to an autonomous driving mode; determining a first pedal value corresponding to a speed of the ADV in response to a speed control command issued at a previous command cycle during which the ADV was operating in the manual driving mode; determining a second pedal value based on a target speed of the ADV at a current command cycle during which the ADV is operating in the autonomous driving mode; and issuing a speed control command to the ADV based on the first pedal value and the second pedal value, such that the ADV runs in a similar acceleration before and after switching from the manual driving mode to the autonomous driving mode.

In a further aspect of the disclosure, the data processing system comprises: a processor; and a memory coupled to the processor to store instructions, which when executed by the processor, cause the processor to perform operations, the operations including: detecting that the autonomous driving vehicle (ADV) transitions from a manual driving mode to an autonomous driving mode, determining a first pedal value corresponding to a speed of the ADV in response to a speed control command issued at a previous command cycle during which the ADV was operating in the manual driving mode, determining a second pedal value based on a target speed of the ADV at a current command cycle during which the ADV is operating in the autonomous driving mode, and issuing a speed control command to the ADV based on the first pedal value and the second pedal value, such that the ADV runs in a similar acceleration before and after switching from the manual driving mode to the autonomous driving mode.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
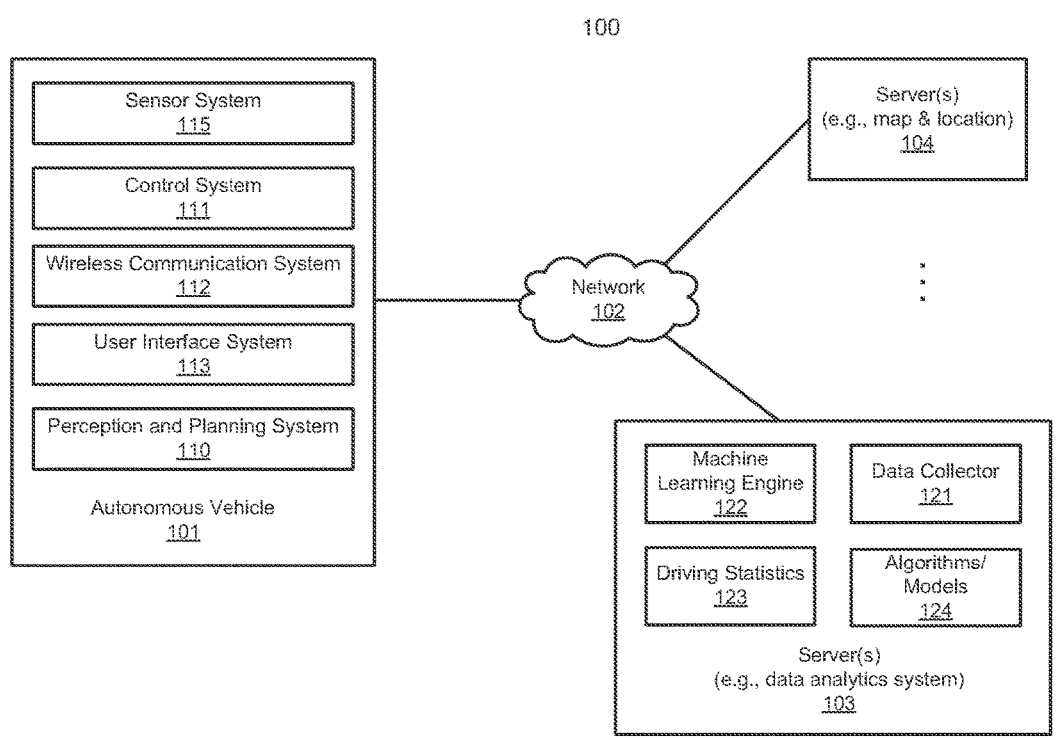
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a controller preset system is utilized to calculate and preset a speed controller of an autonomous driving vehicle to ensure that the output of the speed controller (e.g., speed control commands, pedal percentages) would only gradually change in view of the existing speed when the ADV starts transitioning from a manual driving mode to an autonomous driving mode. As a result, the sudden changes of speeds or velocities during the driving mode transition can be minimized.

According to one embodiment, when an ADV is detected to transition from a manual driving mode to an autonomous driving mode, a first pedal value corresponding to a speed of the ADV is determined. The speed of the ADV (e.g., current speed) is measured from the vehicle platform in response to a speed control command issued at a previous command cycle during which the ADV was operating in the manual driving mode. A second pedal value is determined based on a target speed of the ADV at a current command cycle during which the ADV is operating in an autonomous driving mode. A pedal value represents a pedal percentage of a maximum pedal pressure or maximum pedal distance of a throttle pedal or brake pedal pressed or pushed from a neutral position. A speed command is generated and issued to the ADV based on the first pedal value and the second pedal value, such that the ADV runs in a similar speed or acceleration before and after switching from the manual driving mode to the autonomous driving mode.

In one embodiment, a preset value is calculated based on the first pedal value and the second pedal value. The preset value is utilized as a significant or substantial part of the output of a close-loop controller representing a pedal feedback from the ADV, by passing some or all of the normal operations of the close-loop controller. The second pedal value is determined using an open loop controller based on the target speed. The second pedal value may be determined based on a difference between target speeds requested in different command cycles. A final pedal value is then calculated based on the preset value and the second pedal value, and the speed control command is generated based on the final pedal value. The final pedal value represents the pedal percentage required to maintain a similar speed or acceleration of the ADV prior to the driving mode transition.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
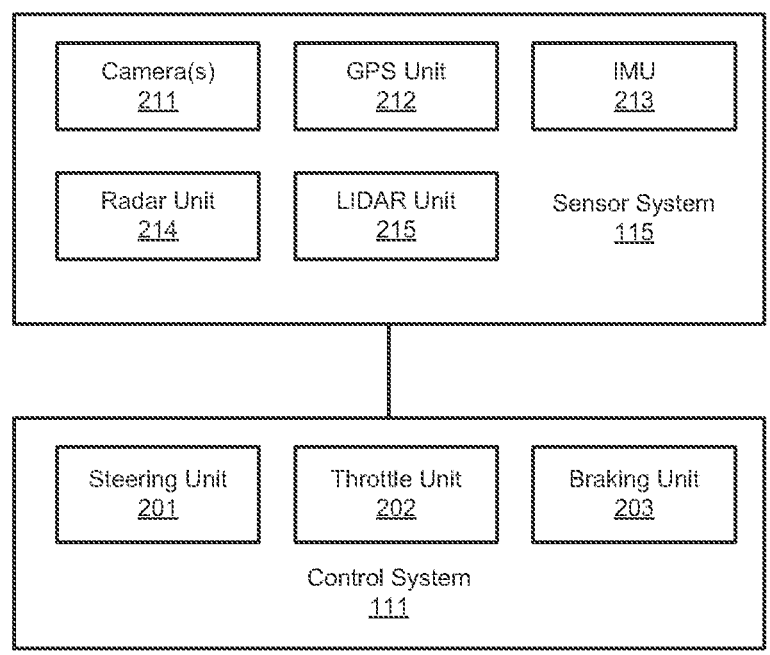
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor. Sensor system 115 may further include sensors that can measure pedal percentage, torque, and speed of the vehicle.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 performs or trains a set of rules, algorithms, and/or predictive models 124 for a variety of purposes. For example, rules 124 may include rules to determine a pedal value based on a target speed, which may be used by an open-loop controller. Rules 124 may include rules to determine a pedal value based on torque measured from a vehicle platform. Algorithms 124 may include an algorithm to calculate a preset value to configure a close-loop controller based on pedal values. The rules and algorithms 124 may then be uploaded onto an autonomous driving vehicle to be utilized in operating the vehicle at real-time. Particularly, rules or algorithms 124 can be utilized when the vehicle transitions from a manual driving mode to an autonomous driving mode, such that the driving mode transition can be as smoothly as possible.

Figure 3:
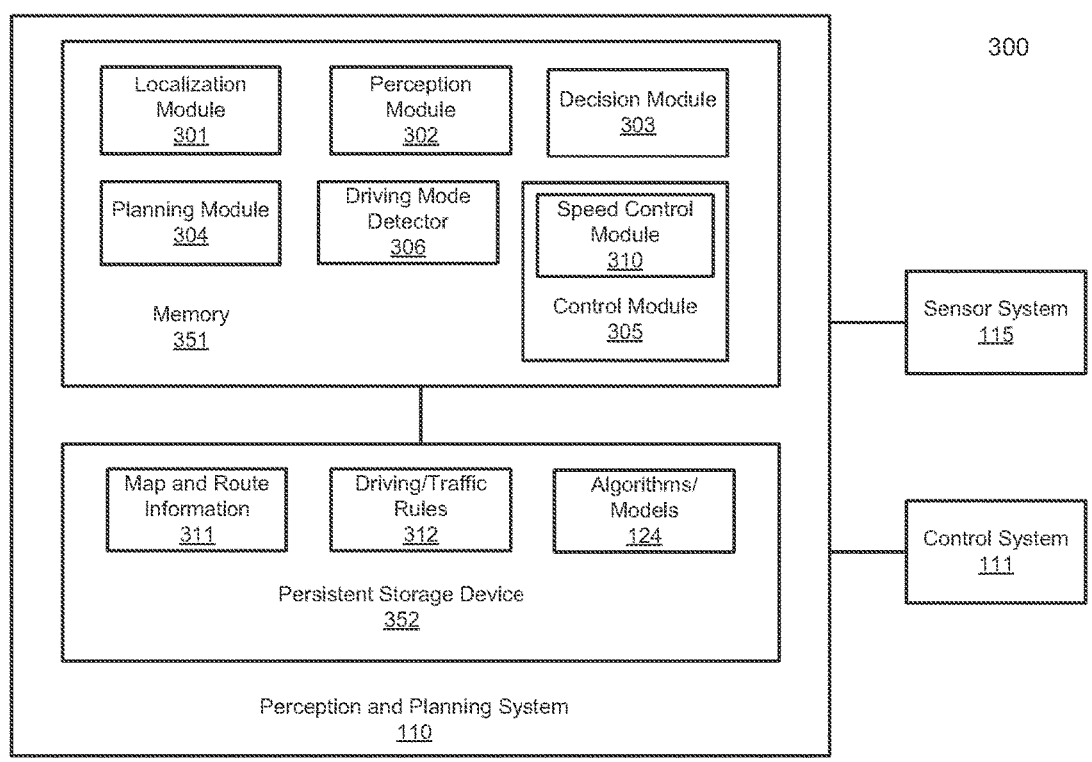
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, control module 305, and driving mode detector 306.

Some or all of modules 301-306 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-306 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

In one embodiment, control module 305 includes speed control module 310 to control the speed of the vehicle. Speed control module 310 is configured to generate a speed control command based on a target speed for a current command cycle and a speed feedback from a previous command cycle. A command cycle refers to a time period within which a control command will be issued to the vehicle. A command cycle represents how frequent a control command will be issued. For example, if a control command will be issued very 0.1 second, the command cycle is referred to as 0.1 second.

As described above, an ADV can operate in a manual driving mode or in an autonomous driving mode, which may be detected or sensed by driving mode detector 306. Typically there may be a switch or button disposed within the reach of a human driver to turn on or off of the manual driving mode or the autonomous driving mode. Such a switching operation may be detected by driving mode detector 306. During the manual driving mode, a human driver can take over the control of the vehicle, including acceleration, deceleration, steering, and backup of the vehicle, etc. The speeds of the vehicle are controlled by how far the human driver presses or steps on the throttle pedal or the brake pedal, which may be represented by a pedal distance or a pedal pressure. During the autonomous driving mode, the operations of the vehicle are substantially controlled by perception and planning system 110 without significant user intervention. The speeds of the vehicle are controlled by speed control commands generated by speed control module 310.

Typically, during the autonomous driving mode, speed control module 310 determines a speed control command based on a target speed of a current command cycle requested by planning module 304 and the current speed of the vehicle measured and fed back from the vehicle platform of the vehicle. The current speed can be measured from the vehicle platform in response to a speed control command issued in a previous command cycle. The target speed may be planned and determined by planning module 304 based on the perception of the driving environment in view of prior planning and control data. When the ADV was operating in a manual driving mode and transitions from the manual driving mode to an autonomous driving mode, planning module 304 requests a target speed that may not be determined based on the prior driving statistics data since the vehicle operates in a manual mode. As a result, there may be a significant difference between the target speed of the current command cycle and the actual speed corresponding to the previous command cycle when the vehicle transitions from the manual driving mode to the autonomous driving mode as shown in FIG. 4.

Figure 4:
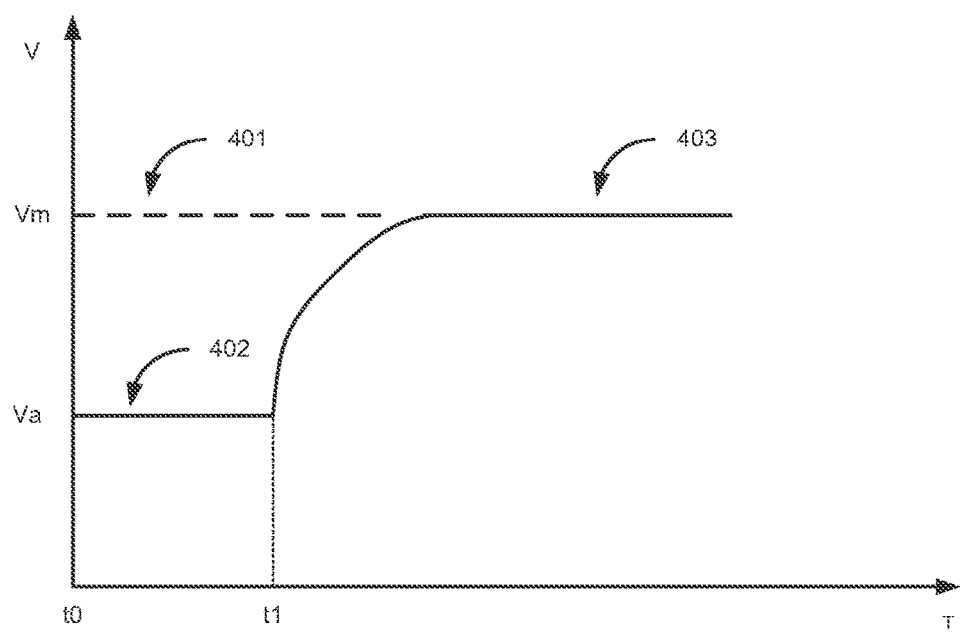
FIG. 4 is a diagram illustrating a driving mode transition of an autonomous driving vehicle according to one embodiment of the invention.

Referring now to FIG. 4, it is assumed the vehicle was traveling at speed 401 during a manual driving mode, also referred to as Vm (manual mode velocity). When the vehicle transitions from the manual driving mode to an autonomous driving mode, planning module 304 plans and determines a target speed of the vehicle for the upcoming command cycle, i.e., the current command cycle. It is assumed planning module 304 determines a target speed for the autonomous driving for the current command cycle, referred to herein as Va as a velocity for autonomous driving. As shown in FIG. 4, during the transition from the manual driving mode and the autonomous driving mode, there is a difference between Vm and Va. Such a difference may cause the sudden change of speed of the vehicle, either in a form of acceleration or deceleration. Such a sudden change of speed may cause the discomfort of the passengers.

Planning module 304 may determine the target speed based on the previous planning and control data, such as a target speed and/or a target location of the vehicle in the previous command cycle or cycles as a part of history driving data. The history driving data may be stored and maintained in a persistent storage device. Since the vehicle was driven in a manual driving mode, such past planning and control data is unavailable or inaccurate (e.g., not up-to-date). As a result, the target speed generated by planning module 304 may be significantly different than the actual speed of the vehicle at the point in time of the driving mode transition. Thus, at the transition time t1 in this example, the target speed 402 is significantly lower than the actual speed of the vehicle 401 at the point in time. If the vehicle is configured according to the planned target speed 402, the vehicle will experience a sudden deceleration when it enters an autonomous driving mode. Similarly, if the target speed 402 is significantly higher than the actual speed 401, the vehicle will experience a sudden acceleration when it enters the autonomous driving mode. Such sudden deceleration or sudden acceleration may cause the passengers uncomfortable. Accordingly, embodiments of the invention are to adjust the target speed 402 to be closer to the actual speed 401 by configuring a controller based on the actual feedback measured at real-time. The actual speed to be targeted will be speed 403 in this example. As a result, the sudden acceleration or sudden deceleration can be reduced.

Figure 5:
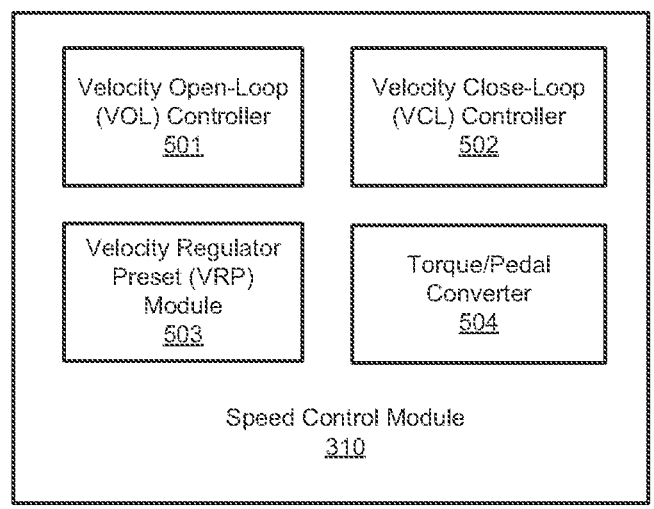
FIG. 5 is a block diagram illustrating an example of a speed control module according to one embodiment of the invention.

FIG. 5 is a block diagram illustrating an example of a speed control module according to one embodiment of the invention. Referring to FIG. 5, speed control module 310 includes a velocity open-loop (VOL) controller 501, a velocity close-loop (VCL) controller 502, velocity regulator preset (VRP) module 503, and torque to pedal (torque/pedal) converter 504. Components 501-504 may be implemented in software, hardware, or a combination thereof. In one embodiment, VOL controller 501 is configured to determine a pedal value representing a pedal percentage based on a target speed. VCL controller 502 is configured to determine a pedal value based on an error or difference between a target speed (e.g., next speed to be achieved) and the actual speed of the vehicle (e.g., current speed). Torque/pedal converter 504 is configured to convert torque measured from the vehicle platform to a pedal value representing a pedal percentage (i.e., the pedal percentage in order to generate the torque measured), which may be utilized to configure or preset VCL controller 504.

Figure 6:
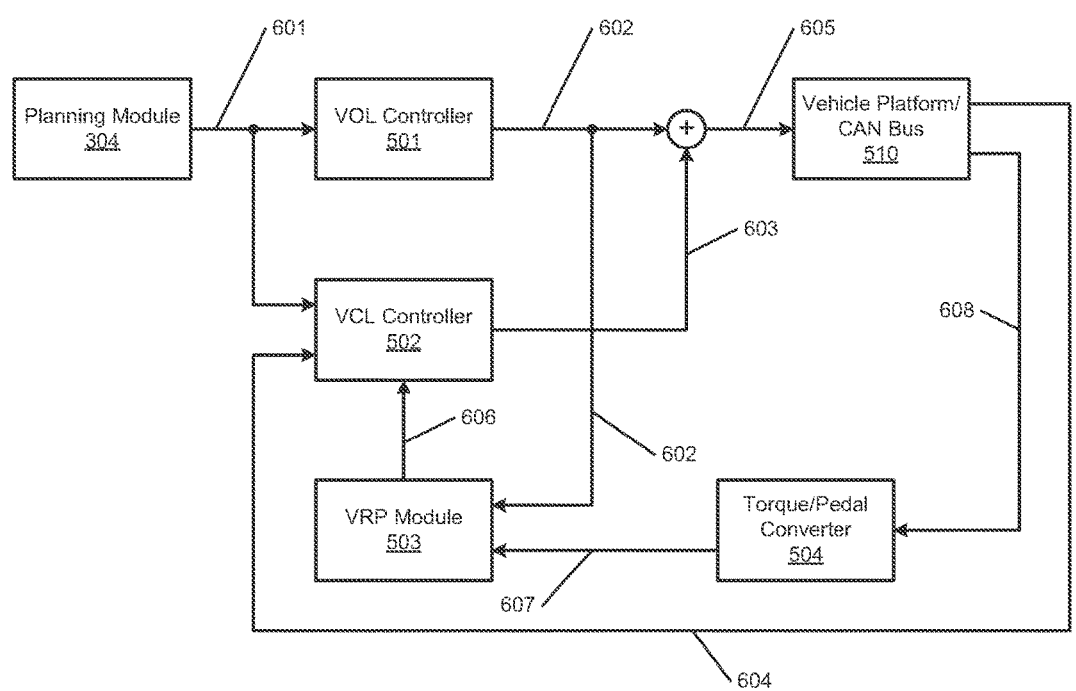
FIG. 6 is a processing flow diagram illustrating a process of a speed control module according to one embodiment of the invention.

FIG. 6 is a processing flow diagram illustrating a process of a speed control module according to one embodiment of the invention. Referring to FIG. 6, in response to a target speed determined by planning module 304, VOL controller 501 determines pedal value 602 based on target speed 601. In one embodiment, VOL controller 501 may determine the pedal value 602 based on a velocity difference over a period of time (e.g., delta time or Δt). For example, VOL controller 501 determines a difference between two target speeds planned at different command cycles. Based on the difference of target speeds, a pedal value representing a pedal percentage is determined. That is, the VOL controller 501 determines how far the throttle/gasoline pedal or brake pedal has to be pressed in order to achieve the change of the target speed, which can be acceleration or deceleration. In one embodiment, VOL controller 501 converts the velocity difference to torque that is required to achieve the target speed change, for example, using a predetermined algorithm or a lookup table. From the torque, VOL controller 501 converts the torque into a pedal value representing a pedal percentage, for example, using a predetermined algorithm or a lookup table.

In addition, VCL controller 502 generates pedal value 603 representing a pedal percentage based on a difference between the target speed 601 received from planning module 304 and the current actual speed 604 measured from vehicle platform 510. The actual speed 604 represents the actual speed of the vehicle in response to a speed control command issued in the previous command cycle. During the transition of the driving mode from a manual driving mode to an autonomous driving mode, the speed control command issued in a previous command cycle represents a human driver's action while the vehicle was operating in a manual driving mode. For example, the steep control command may represent how far or how hard the human driver has stepped or pressed on a throttle pedal or a brake pedal. The pedal value 603 represents a feedback pedal value. The pedal values 602 and 603 are then utilized to control the speed of the vehicle. In one embodiment, the final pedal value 605 is calculated based on pedal value 602 and pedal value 603, in this example, a sum of pedal values 602 and 603. In one embodiment, final pedal value 605 is determined based on a weighted sum of pedal value 602 and pedal value 603. Each of pedal value 602 and pedal value 603 is associated with a particular weighted factor or weighted coefficient, which may be determined offline by a data analytics system such as data analytics 103 based on prior driving statistics.

In one embodiment, VCL controller 502 includes a proportional-integral-derivative (PID) controller (not shown). The PID controller may be modeled by proportional, integral, and derivative coefficients. These coefficients may be initially configured offline by a data analytics system based on a large amount of driving statistics, such as, for example data analytics system or server 103, as follows:

$$u(t) = K_p e(t) + K_i \int_0^t e(t)dt + K_d \frac{de(t)}{dt}$$

where $K_p$, $K_i$, and $K_d$ are the proportional, integral, and derivative coefficients of the PID controller.

A PID is a control loop feedback mechanism (controller) commonly used in industrial control systems. A PID controller continuously calculates an error value as the difference between a desired set point and a measured process variable and applies a correction based on proportional (Kp), integral (Ki), and derivative (Kd) terms. A PID controller continuously calculates an error value as the difference between a desired set point and a measured process variable and applies a correction based on proportional, integral, and derivative terms. The controller attempts to minimize the error over time by adjustment of a control variable to a new value determined by a weighted sum. Referring back to FIG. 6, the error e(t) as an input to the PID controller represents the difference between the target speed 601 provided by planning module 304 and the actual speed 604 measured from vehicle platform 510.

When a vehicle is operating in a manual driving mode, VOL controller 501, VCL controller 502 are not utilized to control the speed of the vehicle, as a human driver is in control of the vehicle. When the vehicle transitions from the manual driving mode to an autonomous driving mode, planning module 304 starts planning and generates a target speed for the vehicle, in this example, target speed 601. Since there is no prior driving data available as references, the planned target speed 601 may be inaccurate or off-target. As a result, the difference between the target speed 601 and the actual speed 604 of the vehicle at the time may be significantly different. Since VCL controller 502 generates the pedal value feedback 603 based on the difference between the target speed 601 and the actual speed 601, the output 603 of VCL controller 502 may be erroneous due to the off-target speed 601 provided by planning module 304.

In one embodiment, VRP module 503 is configured to generate a feedback pedal value 606 for VCL controller 502 based on pedal value 602 generated from VOL controller 501 and pedal value 607 generated by torque/pedal converter 504. The pedal value 607 represents the actual pedal percentage applied to vehicle platform 510 to maintain the actual speed at the point in time. In one embodiment, torque/pedal converter 504 converts torque 608 measured from vehicle platform 510, for example, via the CAN bus of the vehicle into pedal value 607. In one embodiment, torque/pedal converter 504 performs a lookup operation in a torque/pedal mapping table based on the measured torque 608 to derive pedal value 607. In one embodiment, torque/pedal mapping table includes a number of mapping entries. Each mapping entry maps a particular torque value or a range of torque values to a pedal value. VRP module 503 calculates a preset pedal value 606 to configure the output 603 of VCL controller 502 based on pedal value 602 provided by VOL controller 501 and pedal value 607 provided by torque/pedal converter 504.

For purpose of illustration, if the current time or command cycle is referred to as time t, the previous time or previous command cycle is referred to as time (t−Δt). The pedal value for time t is referred to as p(t) while the pedal value for time (t−Δt) is referred to as p(t−Δt). The goal is to generate p(t) 605 to be applied to vehicle platform 510 close to p(t−Δt) as much as possible. Torque/pedal converter 504 converts the torque 608 measured from vehicle platform 510 into pedal value 607 representing p(t−Δt). Based on p(t) 602 provided by VOL controller 501 and p(t−Δt) 607 provided by torque/pedal converter 504, VRP module 503 calculates preset pedal value 606.

In one embodiment, the preset pedal value 606 representing pedal value or a feedback pedal value 603 is determined based on a difference between p(t−Δt) 607 provided by torque/pedal converter 504 and p(t) 602 provided by VOL controller 501, such as approximately p(t−Δt)−p(t). In one embodiment, preset pedal value 606 may be determined based on weighted difference between pedal value 603 and pedal value 607. Each of pedal value 603 and pedal value 607 may be associated with a specific weighted factor or weight coefficient. The calculated preset pedal value 606 will be utilized as a significant or substantial portion of output 603 of VCL controller 502 representing the pedal value feedback, bypassing some or all of the internal operations of VCL controller 502. The final pedal value 605 to be applied to vehicle platform 510 would be, for example, the sum of pedal value p(t) 602 and the pedal value p(t−Δt)−p(t) 603, wherein the final pedal value 605 will be close to p(t−Δt). That is, for current time (t), the final pedal value p(t) 605 is close to p(t−Δt) of the previous command cycle. During the transition of the driving mode from a manual driving mode to an autonomous driving mode, the speed control command issued in a previous command cycle represents a human driver's action, such as stepping on a throttle pedal or a brake pedal. As a result, the sudden acceleration or deceleration due to the difference between the final pedal value p(t) and previously final pedal value p(t−Δt) can be reduced. Thereafter, the velocity reference p(t) shall gradually deviate from the velocity feedback p(t−Δt).

Figure 7:
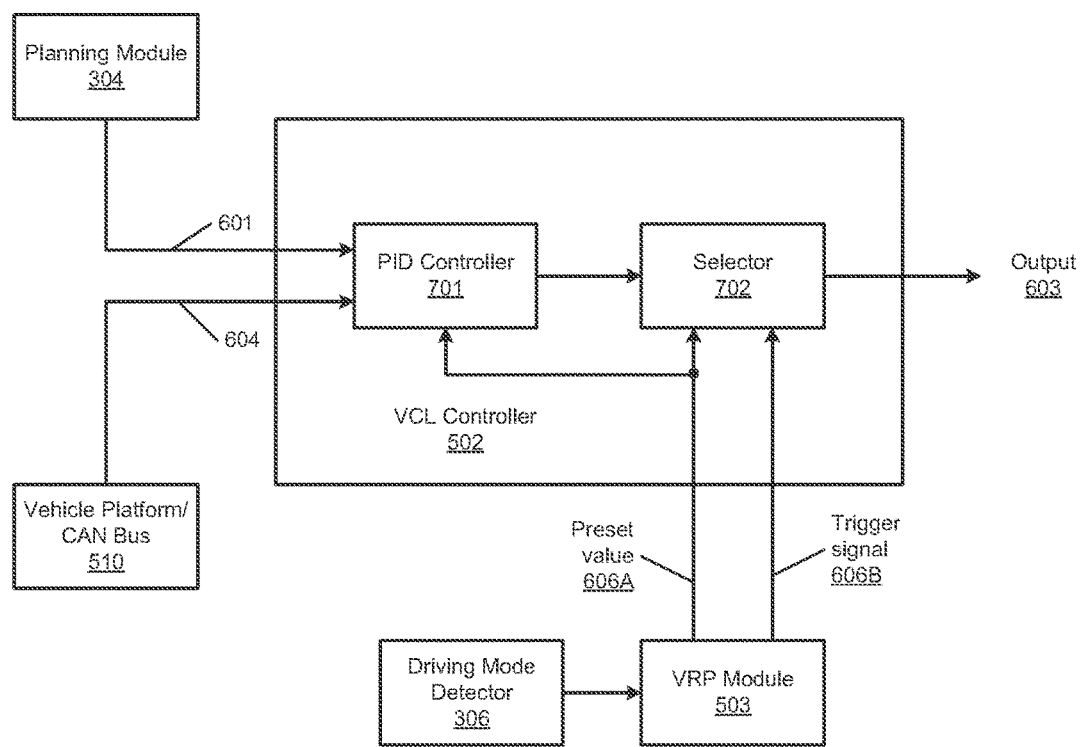
FIG. 7 is a block diagram illustrating an example of a velocity close-loop controller according to one embodiment of the invention.

FIG. 7 is a block diagram illustrating an example of a velocity close-loop controller according to one embodiment of the invention. Referring to FIG. 7, VCL controller 502 includes a PID controller 701 and selector logic 702. Selector 702 is configured to select either the output from PID controller 701 or the output 606 from VRP module 503. In one embodiment, VRP module 503, as well as other components involved as described above constantly or periodically calculates a preset pedal value 606A while the vehicle is operating, either in a manual driving mode or in an autonomous driving mode. During the normal autonomous driving mode, selector 702 would select the output of PID controller 701 to become the output of VCL controller 502.

In response to a detection of the driving mode changing from the manual driving mode to the autonomous driving mode, which may be detected by driving mode detector 306, trigger signal 606B is sent to selector 702 to instruct selector 702 to select the output of VRP module 503, i.e., preset pedal value 606A to become the output 603 of VCL controller 502. The trigger signal 606B may be a selection signal in either a logically low level, a logically high level, a rising edge, or a falling edge. One of the logical levels or edges may be utilized to instruct selector 702 to select output of either PID controller 701 or VRP module 503. In another embodiment, driving mode detector 306 may be directly coupled to selector 702 to provide the selection signal (e.g., signal 606B), while VRP module 503 only provides preset pedal value 606A. In one embodiment, preset value 606A may be used to modify one or more coefficients or parameters of PID controller 701, such as, for example, Ki coefficient of PID controller 701. This in effect presets certain terms, such as the integral term, of PID controller 701.

Figure 8:
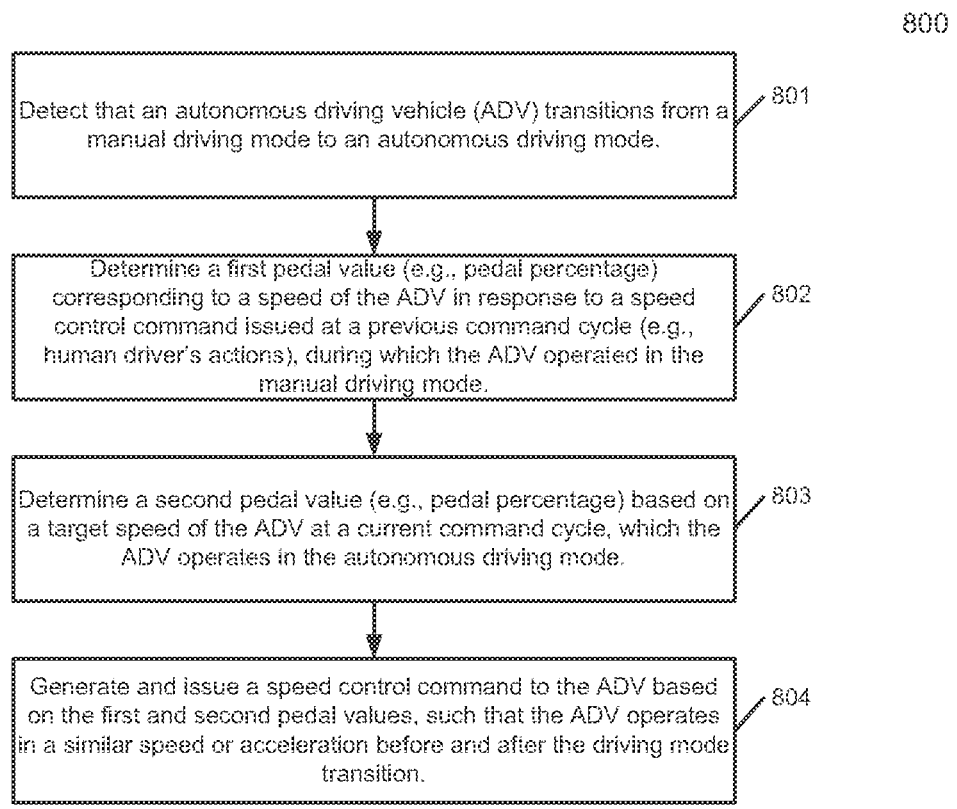
FIG. 8 is a flow diagram illustrating a process of operating an autonomous driving vehicle according to one embodiment of the invention.

FIG. 8 is a flow diagram illustrating a process of operating an autonomous driving vehicle according to one embodiment of the invention. Process 800 may be performed by processing logic which may include software, hardware, or a combination thereof. For example, process 800 may be performed by control module 305 of FIG. 3. Referring to FIG. 8, in operation 801, processing logic detects that the ADV transitions from a manual driving mode to an autonomous driving mode. In response to the detection, in operation 802, processing logic determines a first pedal value corresponding to a speed of the ADV in response to a speed control command issued in a previous command cycle (t−Δt). During the transition of the driving mode from a manual driving mode to an autonomous driving mode, the speed control command issued in a previous command cycle represents a human driver's action, such as stepping on a throttle pedal or a brake pedal. A pedal value represents a pedal percentage of a maximum distance or pressure a pedal (e.g., a throttle pedal or brake pedal) has been pressed. For example, the first pedal value may be generated by VRP module 503 and/or torque/pedal converter 504 as part of the pedal feedback. In operation 803, processing logic determines a second pedal value based on a target speed of the ADV at a current command cycle (t) during which the ADV is operating in the autonomous driving mode. In operation 804, processing logic issue a speed control command to the ADV based on a final pedal value determined from the first pedal value and the second pedal value, such that the ADV operates in a similar speed or acceleration before and after switching from the manual driving mode to the autonomous driving mode.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
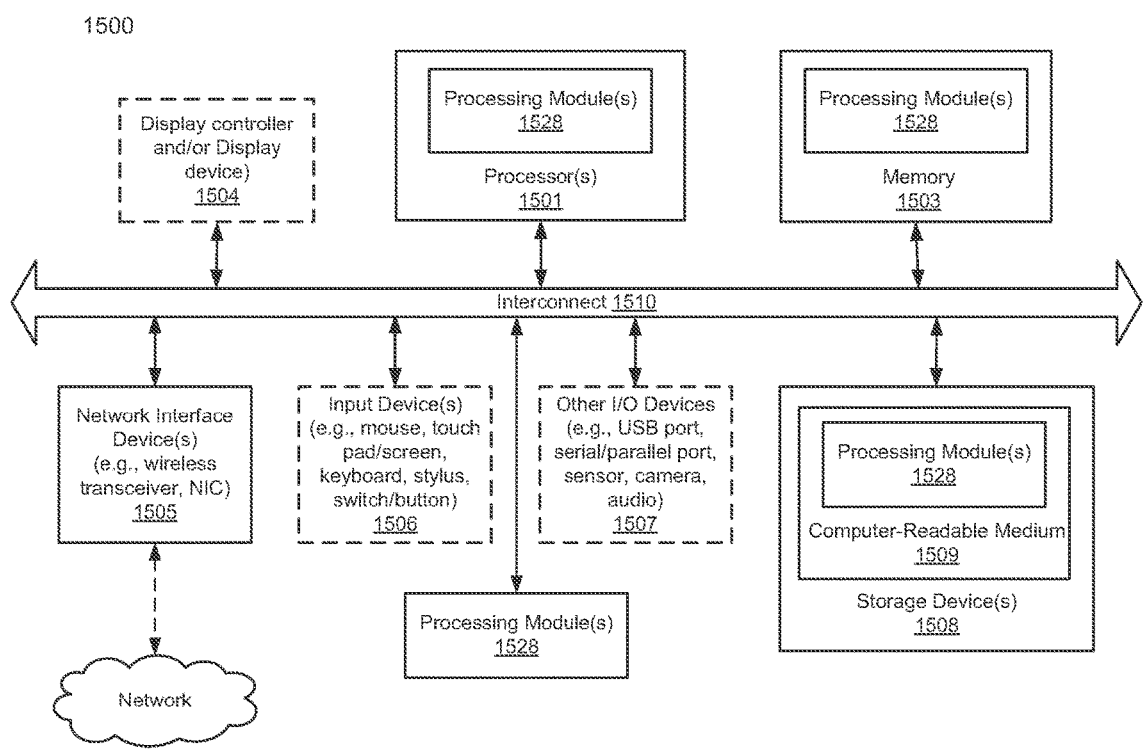
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 304 and control module 305. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   detecting that the autonomous driving vehicle (ADV) transitions from a manual driving mode to an autonomous driving mode;
   determining a first pedal value corresponding to a speed of the ADV in response to a speed control command issued at a previous command cycle during which the ADV was operating in the manual driving mode;
   determining a second pedal value based on a target speed of the ADV at a current command cycle during which the ADV is operating in the autonomous driving mode; and
   issuing a speed control command to the ADV based on the first pedal value and the second pedal value, wherein the speed control command results in a substantially gradual speed change of the ADV between the manual driving mode and the autonomous driving mode.

2. The method of claim 1, wherein determining a first pedal value comprises:
   measuring a first torque value based on sensor data from the ADV at the previous command cycle; and
   determining the first pedal value based on the first torque value of the ADV using a predetermined algorithm.

3. The method of claim 2, wherein determining the first pedal value based on the first torque value comprises performing a lookup operation in a torque to pedal (torque/pedal) mapping table, wherein the torque/pedal mapping table includes a plurality of mapping entries, each mapping entry mapping a particular torque value to a particular pedal value.

4. The method of claim 1, wherein determining a second pedal value based on a target speed of the ADV comprises:
   determining a target speed for the previous command cycle; and
   determining the second pedal value based on a difference between the target speed of the current command cycle and the target speed of the previous command cycle.

5. The method of claim 4, further comprising:
   calculating a torque value representing a torque required to change the target speed from the previous command cycle to the current command cycle; and
   converting the torque value to the second pedal value using a torque/pedal mapping table.

6. The method of claim 1, further comprising:
   calculating a preset value based on the first pedal value and the second pedal value, wherein the preset value is utilized as an output of a close loop controller representing a pedal feedback from the ADV; and
   calculating a final pedal value based on the preset value and the second pedal value, wherein the speed control command is issued based on the final pedal value.

7. The method of claim 6, wherein the close loop controller is to generate the pedal feedback based on the target speed of the current command cycle and an actual speed of the ADV in response to a speed control command issued in previous command cycle during the autonomous driving mode.

8. The method of claim 7, wherein the preset value is utilized by the close loop controller in lieu of the pedal feedback calculated based on the target speed and the actual speed in response to the detection that the ADV transitions from the manual driving mode to the autonomous driving mode.

9. The method of claim 1, wherein a pedal value represents a percentage of a maximum pedal value of a throttle pedal or a brake pedal for speed control of the ADV.

10. A non-transitory machine-readable medium having instructions stored therein, which when executed by a processor, cause the processor to perform operations, the operations comprising:
    detecting that the autonomous driving vehicle (ADV) transitions from a manual driving mode to an autonomous driving mode;

determining a first pedal value corresponding to a speed of the ADV in response to a speed control command issued at a previous command cycle during which the ADV was operating in the manual driving mode;

determining a second pedal value based on a target speed of the ADV at a current command cycle during which the ADV is operating in the autonomous driving mode; and issuing a speed control command to the ADV based on the first pedal value and the second pedal value, wherein the speed control command results in a substantially gradual speed change of the ADV between the manual driving mode and the autonomous driving mode.

11. The machine-readable medium of claim 10, wherein determining a first pedal value comprises:

measuring a first torque value based on sensor data from the ADV at the previous command cycle; and determining the first pedal value based on the first torque value of the ADV using a predetermined algorithm.

12. The machine-readable medium of claim 11, wherein determining the first pedal value based on the first torque value comprises performing a lookup operation in a torque to pedal (torque/pedal) mapping table, wherein the torque/pedal mapping table includes a plurality of mapping entries, each mapping entry mapping a particular torque value to a particular pedal value.

13. The machine-readable medium of claim 10, wherein determining a second pedal value based on a target speed of the ADV comprises:

determining a target speed for the previous command cycle; and determining the second pedal value based on a difference between the target speed of the current command cycle and the target speed of the previous command cycle.

14. The machine-readable medium of claim 13, wherein the operations further comprise:

calculating a torque value representing a torque required to change the target speed from the previous command cycle to the current command cycle; and converting the torque value to the second pedal value using a torque/pedal mapping table.

15. The machine-readable medium of claim 10, wherein the operations further comprise:

calculating a preset value based on the first pedal value and the second pedal value, wherein the preset value is utilized as an output of a close loop controller representing a pedal feedback from the ADV; and calculating a final pedal value based on the preset value and the second pedal value, wherein the speed control command is issued based on the final pedal value.

16. The machine-readable medium of claim 15, wherein the close loop controller is to generate the pedal feedback based on the target speed of the current command cycle and an actual speed of the ADV in response to a speed control command issued in previous command cycle during the autonomous driving mode.

17. The machine-readable medium of claim 16, wherein the preset value is utilized by the close loop controller in lieu of the pedal feedback calculated based on the target speed and the actual speed in response to the detection that the ADV transitions from the manual driving mode to the autonomous driving mode.

18. A data processing system, comprising:
a processor; and
a memory coupled to the processor to store instructions, which when executed by the processor, cause the processor to perform operations, the operations including detecting that the autonomous driving vehicle (ADV) transitions from a manual driving mode to an autonomous driving mode, determining a first pedal value corresponding to a speed of the ADV in response to a speed control command issued at a previous command cycle during which the ADV was operating in the manual driving mode, determining a second pedal value based on a target speed of the ADV at a current command cycle during which the ADV is operating in the autonomous driving mode, and issuing a speed control command to the ADV based on the first pedal value and the second pedal value, wherein the speed control command results in a substantially gradual speed change of the ADV between the manual driving mode and the autonomous driving mode.

19. The system of claim 18, wherein determining a first pedal value comprises:

measuring a first torque value based on sensor data from the ADV at the previous command cycle; and determining the first pedal value based on the first torque value of the ADV using a predetermined algorithm.

20. The system of claim 19, wherein determining the first pedal value based on the first torque value comprises performing a lookup operation in a torque to pedal (torque/pedal) mapping table, wherein the torque/pedal mapping table includes a plurality of mapping entries, each mapping entry mapping a particular torque value to a particular pedal value.

21. The system of claim 18, wherein determining a second pedal value based on a target speed of the ADV comprises:

determining a target speed for the previous command cycle; and determining the second pedal value based on a difference between the target speed of the current command cycle and the target speed of the previous command cycle.

22. The system of claim 21, wherein the operations further comprise:

calculating a torque value representing a torque required to change the target speed from the previous command cycle to the current command cycle; and converting the torque value to the second pedal value using a torque/pedal mapping table.

23. The system of claim 18, wherein the operations further comprise:

calculating a preset value based on the first pedal value and the second pedal value, wherein the preset value is utilized as an output of a close loop controller representing a pedal feedback from the ADV; and calculating a final pedal value based on the preset value and the second pedal value, wherein the speed control command is issued based on the final pedal value.

24. The system of claim 23, wherein the close loop controller is to generate the pedal feedback based on the target speed of the current command cycle and an actual speed of the ADV in response to a speed control command issued in previous command cycle during the autonomous driving mode.

* * * * *